United States Patent
Farrell et al.

(10) Patent No.: US 7,450,714 B2
(45) Date of Patent: *Nov. 11, 2008

(54) ECHO CANCELLER HAVING IMPROVED NON-LINEAR PROCESSOR

(75) Inventors: David S. Farrell, Lisle, IL (US); Tianfang Liu, De Kalb, IL (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/336,348

(22) Filed: Jan. 19, 2006

(65) Prior Publication Data

US 2006/0115078 A1  Jun. 1, 2006

Related U.S. Application Data

(63) Continuation of application No. 10/271,189, filed on Oct. 15, 2002, now Pat. No. 7,020,278, which is a continuation of application No. 09/535,305, filed on Mar. 24, 2000, now Pat. No. 6,516,063, which is a continuation of application No. 08/970,639, filed on Nov. 14, 1997, now Pat. No. 6,198,819.

(51) Int. Cl.
*H04M 0/08* (2006.01)
(52) U.S. Cl. ............................... 379/406.05; 379/406.02
(58) Field of Classification Search ........................ None
See application file for complete search history.

(56) References Cited

U.S. PATENT DOCUMENTS

| | | | |
|---|---|---|---|
| 3,699,271 A | 10/1972 | Berkley et al. | |
| 3,787,645 A | 1/1974 | Ochiai et al. | |
| RE28,919 E | 7/1976 | Berkley et al. | |
| 4,679,230 A | 7/1987 | Lassaux et al. | |
| 4,712,235 A | 12/1987 | Jones, Jr. | |
| 4,897,832 A | 1/1990 | Suzuki et al. | |
| 5,157,653 A | 10/1992 | Genter | |
| 5,274,705 A * | 12/1993 | Younce et al. | 379/406.05 |
| 5,283,784 A * | 2/1994 | Genter | 370/288 |
| 5,315,585 A | 5/1994 | Iizuka et al. | |
| 5,327,495 A | 7/1994 | Shenoi et al. | |
| 5,329,586 A | 7/1994 | Agazzi | |
| 5,434,916 A | 7/1995 | Hasegawa | |

(Continued)

FOREIGN PATENT DOCUMENTS

WO    WO-97/23055    *  6/1997

*Primary Examiner*—Ramnandan Singh
(74) *Attorney, Agent, or Firm*—Hamilton, Brook, Smith & Reynolds, P.C.

(57) ABSTRACT

A non-linear processor for use in an echo canceller is set forth. The non-linear processor includes a center clipping digital filter receiving an echo compensated signal. The non-linear processor provides a center clipped output signal having non-linear thresholds at values of $+T_{NLP}$ and $-T_{NLP}$. The value of $T_{NLP}$ is dynamically dependent, at least in part, on echo return loss measurements. To limit the processor's susceptibility to corruption from double-talk conditions, the non-linear processor inhibits the dynamic setting of the $T_{NLP}$ value when a double-talk condition is present. Additionally, or in the alternative, the non-linear processor locks the value of the echo return loss measurement after a predetermined number of consecutive echo return loss measurements have values falling within a predetermined range of one another. Such locking further reduces the susceptibility of the non-linear processor to corruption from double-talk conditions.

23 Claims, 13 Drawing Sheets

U.S. PATENT DOCUMENTS

| | | |
|---|---|---|
| 5,475,731 A | 12/1995 | Rasmusson |
| 5,606,550 A * | 2/1997 | Jangi .......................... 370/289 |
| 5,664,011 A | 9/1997 | Crochiere et al. |
| 6,125,179 A * | 9/2000 | Wu ........................ 379/406.01 |
| 6,195,430 B1 * | 2/2001 | Eriksson et al. ........ 379/406.05 |
| 6,198,819 B1 * | 3/2001 | Farrell et al. ........... 379/406.08 |
| 6,205,208 B1 * | 3/2001 | Detlefsen et al. ......... 379/93.05 |
| 6,466,666 B1 | 10/2002 | Eriksson |
| 6,516,063 B1 * | 2/2003 | Farrell et al. ........... 379/406.08 |
| 7,020,278 B2 * | 3/2006 | Farrell et al. ........... 379/406.05 |

* cited by examiner

ECHO CANCELLER HAVING IMPROVED NON-LINEAR PROCESSOR

CROSS-REFERENCE TO RELATED APPLICATIONS

The present application is a continuation of and claims the 35 U.S.C. § 120 benefits of non-provisional patent application Ser. No. 10/271,189, filed on Oct. 15, 2002, now U.S. Pat. No. 7,020,278, which is a continuation of application Ser. No. 09/535,305, filed on Mar. 24, 2000, now U.S. Pat. No. 6,516,063 B1, which is a continuation of application Ser. No. 08/970,639, filed Nov. 14, 1997, now U.S. Pat. No. 6,198,819 B1. The following applications, filed on Nov. 14, 1997, are incorporated by reference: application Ser. No. 08/970,230, "Echo Canceller Employing Dual-H Architecture Having Improved Coefficient Transfer", now U.S. Pat. No. 6,181,793 B1; application Ser. No. 08/971,116, "Echo Canceller Employing Dual-H Architecture Having Improved Double-Talk Detection", now U.S. Pat. No. 6,266,409 B1; application Ser. No. 08/970,228, "Echo Canceller Employing Dual-H Architecture Having Improved Non-Linear Echo Path Detection", now U.S. Pat. No. 6,028,929; application Ser. No. 08/970,874, "Echo Canceller Employing Dual-H Architecture Having Variable Adaptive Gain Settings", now U.S. Pat. No. 6,031,908; application Ser. No. 08/970,229, "Echo Canceller Employing Dual-U Architecture Having Split Adaptive Gain Settings", now U.S. Pat. No. 6,240,180.

STATEMENT REGRADING FEDERALLY SPONSORED RESEARCH OR DEVELOPMENT

Not applicable.

BACKGROUND OF THE INVENTION

The present invention relates generally to echo cancellation More specifically, the present invention relates to an echo canceller including an improved non-linear processor with adaptive thresholding.

Long distance telephone facilities usually comprise four-wire transmission circuits between switching offices in different local exchange areas, and two-wire circuits within each area connecting individual subscribers with the switching office. A call between subscribers in different exchange areas is carried over a two-wire circuit in each of the areas and a four-wire circuit between the areas, with conversion of speech energy between the two and four-wire circuits being effected by hybrid circuits. Ideally, the hybrid circuit input ports perfectly match the impedances of the two and four-wire circuits, and its balance network impedance perfectly matches the impedance of the two-wire circuit. In this manner, the signals transmitted from one exchange area to the other will not be reflected or returned to the one area as echo. Unfortunately, due to impedance differences which inherently exist between different two and four-wire circuits, and because impedances must be matched at each frequency in the voice band, it is virtually impossible for a given hybrid circuit to perfectly match the impedances of any particular two and four-wire transmission circuit. Echo is, therefore, characteristically part of a long distance telephone system.

Although undesirable, echo is tolerable in a telephone system so song as the time delay in the echo path is relatively short, for example, shorter than about 40 milliseconds. However, longer echo delays can be distracting or utterly confusing to a far end speaker, and to reduce the same to a tolerable level an echo canceller may be used toward each end of the the path to cancel echo which otherwise would return to the far end speaker. As is known, echo cancellers monitor the signals on the receive channel of a four-wire circuit and generate estimates of the actual echoes expected to return over the transmit channel. The echo estimates are then applied to a subtractor circuit in the transmit channel to remove or at least reduce the actual echo.

In simplest form, generation of an echo estimate comprises obtaining individual samples of the signal on the receive channel, convolving the samples with the impulse response of the system and then subtracting, at the appropriate time, the resulting products or echo estimates from the actual echo on the transmit channel. In actual practice generation of an echo estimate is not nearly so straightforward.

Transmission circuits, except those which are purely resistive, exhibit an impulse response which has amplitude and phase dispersive characteristics that are frequency dependent, since phase shift and amplitude attenuation vary with frequency. To this end, a suitable known technique for generating an echo estimate contemplates manipulating representations of a plurality of samples of signals which cause the echo and samples of impulse responses of the system through a convolution process to obtain an echo estimate which reasonably represents the actual echo expected on the echo path. One such system is illustrated in FIG. 1.

In the system illustrated in FIG. 1, a far end signal x from a remote telephone system is received locally at line 10. As a result of the previously noted imperfections in the local system, a portion of the signal x is echoed back to the remote site at line IS along with the signal v from the local telephone system. The echo response is illustrated here as a signal s corresponding to the following equation:

$$s = x * h$$

where h is the impulse response of the echo characteristics. As such, the signal sent from the near end to the far end, absent echo cancellation, is the signal y, which is the sum of the telephone signal v and the echo signal s. This signal is illustrated as y at line 15 of FIG. 1.

To reduce and/or eliminate the echo signal component s from the signal y, the system of FIG. 1 uses an echo canceller having an impulse response filter $\bar{h}$ that is the estimate of the impulse echo response h. As such, a further signal $\bar{s}$ representing an estimate of echo signal s is generated by the echo canceller in accordance with the following equation:

$$\bar{s} = \bar{h} * x$$

The echo canceller subtracts the echo estimate signal $\bar{s}$ from the signal y to generate a signal e at line 20 that is returned to the far end telephone system. The signal e thus corresponds to the following equation:

$$e = s + v - \bar{s} \approx v$$

As such, the signal returned to the far end station is dominated by the signal v of the near end telephone system. As the echo impulse response $\bar{h}$ more closely correlates to the actual echo response h, then $\bar{s}$ more closely approximates s and thus the magnitude of the echo signal component s on the signal e is more substantially reduced.

The echo impulse response model $\bar{h}$ may be replaced by an adaptive digital filter having an impulse response $\hat{h}$. Generally, the tap coefficients for such an adaptive response filter are found using a technique known as Normalized Least Mean Squares adaptation.

Although such an adaptive echo canceller architecture provides the echo canceller with the ability to readily adapt to changes in the echo path response h, it is highly susceptible to generating sub-optimal echo cancellation responses in the presence of "double talk" (a condition that occurs when both the speaker at the far end and the speaker at the near end are speaking concurrently as determined from the viewpoint of the echo canceller).

To reduce this sensitivity to double-talk conditions, it has been suggested to use both a non-adaptive response and an adaptive response filter in a single echo canceller. One such echo canceller is described in U.S. Pat. No. 3,787,645, issued to Ochiai et al on Jan. 22, 1974. Such an echo canceller is now commonly referred to as a dual-H echo canceller.

Another problem confronting echo canceller circuits is the possibility that the echo path response is non-linear. Such non-linear echo paths are often present in, for example, cellular telephone systems. The echo canceller must not only detect the non-linear echo response condition, it must also be able to reduce the effects of the non-linear response. The present inventors have recognized that the dual-H architecture may itself be employed to assist in detecting a non-linear echo path to thereby signal the echo canceller of the condition so that the echo canceller may respond in the appropriate manner. Further, the effects of the non-linearities are substantially reduced using a unique non-linear processor. The non-linear processor counters echo due to non-linear echo paths. Further, it also eliminates residual echo due to limitations of the system (e.g., quantization error) and minor inhibitors (e.g., low levels of background noise).

BRIEF SUMMARY OF THE INVENTION

A non-linear processor for use in an echo canceller is set forth. The non-linear processor includes a center clipping digital filter receiving an echo compensated signal. The non-linear processor provides a center clipped output signal having non-linear thresholds at values of $+T_{NLP}$ and $-T_{NLP}$. The value of $T_{NLP}$ is dynamically dependent, at least in part, on echo return loss measurements. To limit the processor's susceptibility to corruption from double-talk conditions, the non-linear processor inhibits the dynamic setting of the $T_{NLP}$ value when a double-talk condition is present. Additionally, or in the alternative, the non-linear processor locks the value of the echo return loss measurement after a predetermined number of consecutive echo return loss measurements have values falling within a predetermined range of one another. Such locking further reduces the susceptibility of the non-linear processor to corruption from double-talk conditions.

DETAILED DESCRIPTION OF THE INVENTION

Figure 1:
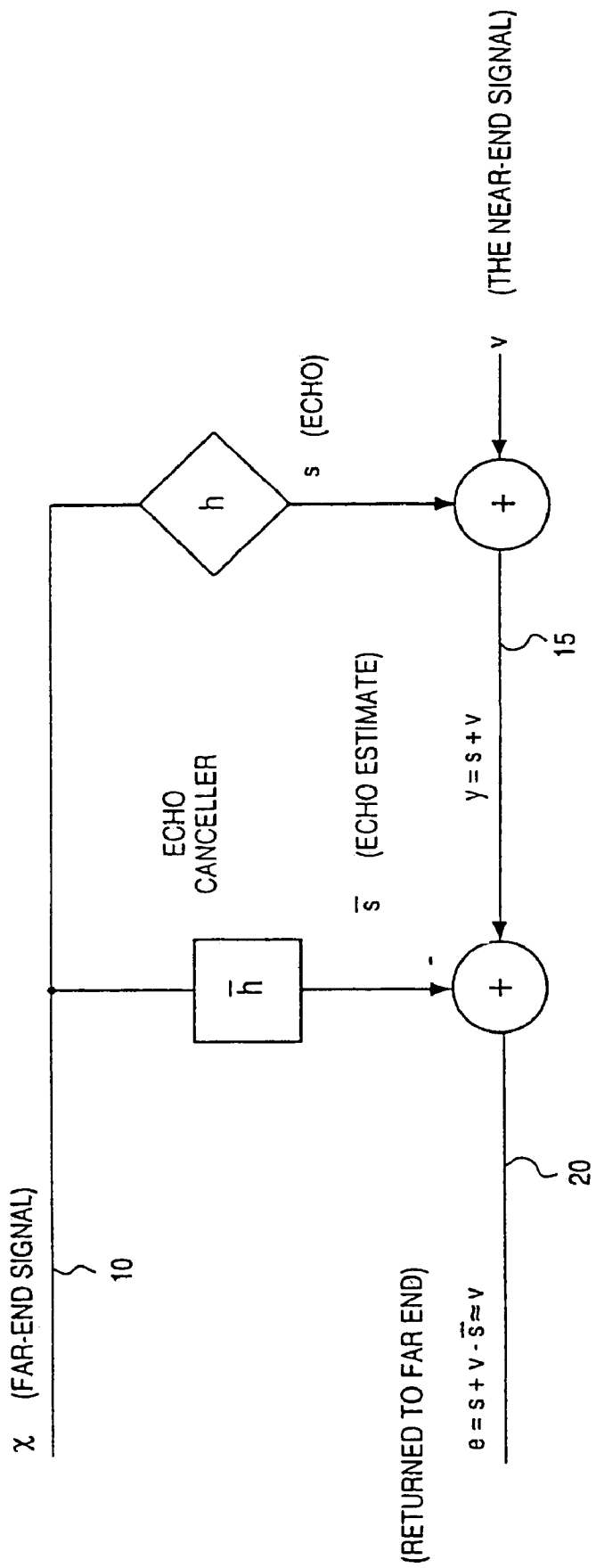
FIG. 1 is a block diagram of a conventional canceller.
Figure 2:
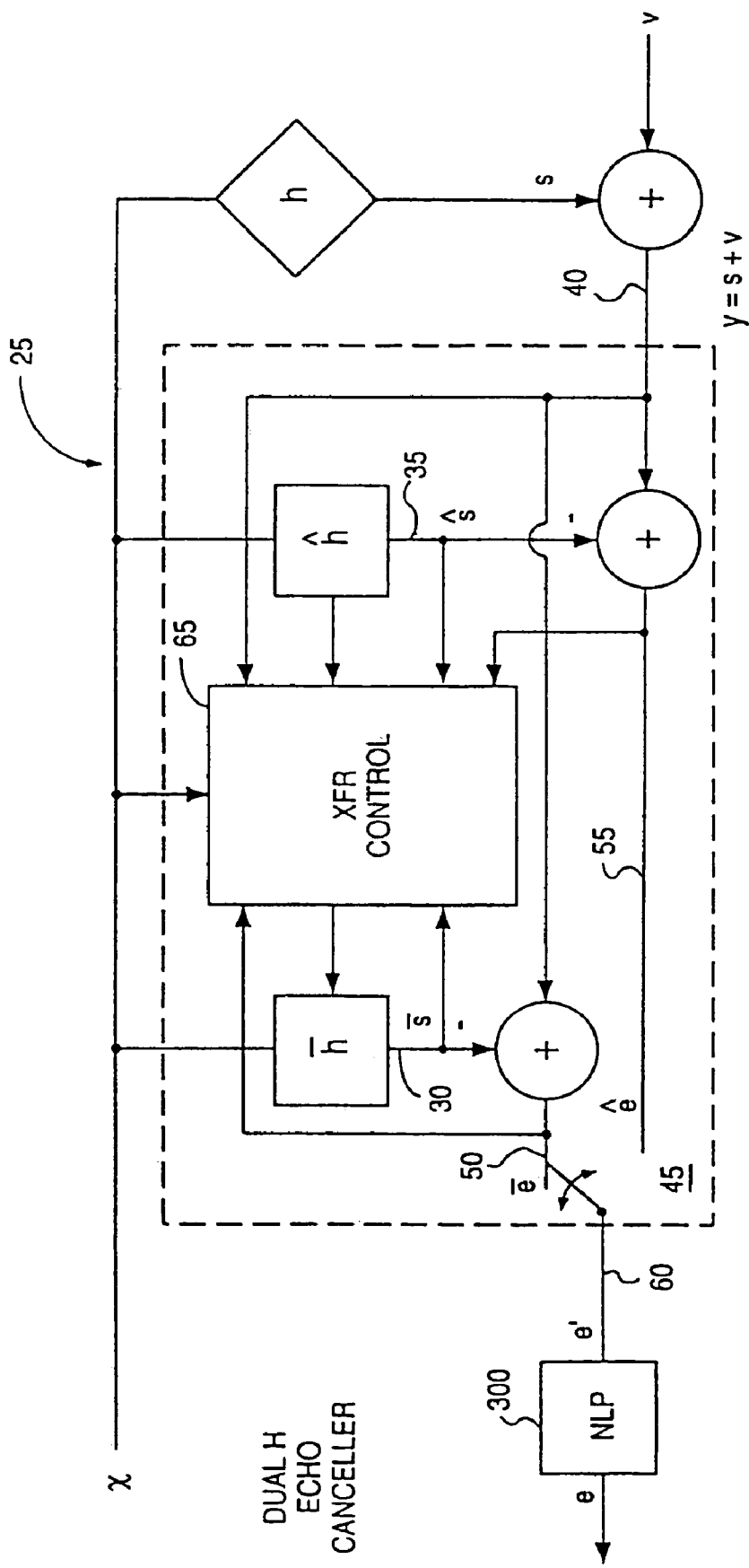
FIG. 2 is a schematic block diagram of an echo canceller that operates in accordance with one embodiment of the present invention.

FIG. 2 illustrates one embodiment of a dual-h echo canceller suitable for use in implementing the present invention. As illustrated, the echo canceller, shown generally at 25, includes both a non-adaptive filter h̄ and an adaptive filter ĥ to model the echo response h. Each of the filters h̄ and ĥ are preferably implemented as digital filters, such as finite impulse response (FIR) filters comprising a plurality of taps each having a corresponding tap coefficient. This concept may be extended to IIR filters as well. If FIR filters are used, the duration of each of the FIR filters should be sufficient to cover the duration of the echo response of the channel in which the echo canceller 25 is disposed.

The output of the non-adaptive filter h̄ is available at the line 30 while the output of the adaptive filter ĥ is available at line 35. Each of the signals at lines 30 and 35 are subtracted from the signal-plus-echo signal of line 40 to generate echo compensated signals at lines 50 and 55, respectively. A switch 45, preferably a software switch, may be used to selectively provide either the output signal at the line 50 or the output signal at line 55 to the echo canceller output at line 60. The switch 45 may be used to provide the echo compensation based on the ĥ filter during convergence and then be switched to provide the echo compensation based on the h̄ filter after convergence. Further, the switch 45 is directed to provide the echo compensation based on the h̄ filter in response to the detection of a double-talk condition.

A transfer controller 65 is used to transfer the tap coefficients of filter ĥ to replace the tap coefficients of filter h̄. As illustrated, the transfer controller 65 is connected to receive a number of system input signals. Of particular import with respect to the present invention, the transfer controller 65 receives the signal-plus-echo response y and each of the echo canceller signals ē and e at lines 50 and 55, respectively. The transfer controller 65 is preferably implemented in the software of one or more digital signal processors used to implement the echo canceller 25.

As noted above, the art is substantially deficient of teachings with respect to the manner in which and conditions under which a transfer of tap coefficients from ĥ to h̄ is to occur. The present inventors have implemented a new process and, as such a new echo canceller in which tap coefficient transfers are only made by the transfer controller 65 when selected criterion are met. The resulting echo canceller 25 has substantial advantages with respect to reduced double-talk sensitivity and increased double-talk detection capability. Further, it ensures a monotonic improvement in the estimates $\bar{h}$.

The foregoing system uses a parameter known as echo-return-loss-enhancement (ERLE) to measure and keep track of system performance. Two ERLE parameter values are used in the determination as to whether the transfer controller 65 transfers the tap coefficients from $\hat{h}$ to $\bar{h}$. The first parameter, $\bar{E}$, is defined in the following manner:

$$\bar{E} = \frac{y}{\bar{e}}$$

Similarly, the parameter $\hat{E}$ is defined as follows:

$$\hat{E} = \frac{y}{\hat{e}}$$

Each of the values $\hat{E}$ and $\bar{E}$ may also be averaged over a predetermined number of samples to arrive at averaged $\hat{E}$ and $\bar{E}$ values used in the system for the transfer determinations.

Figure 3:
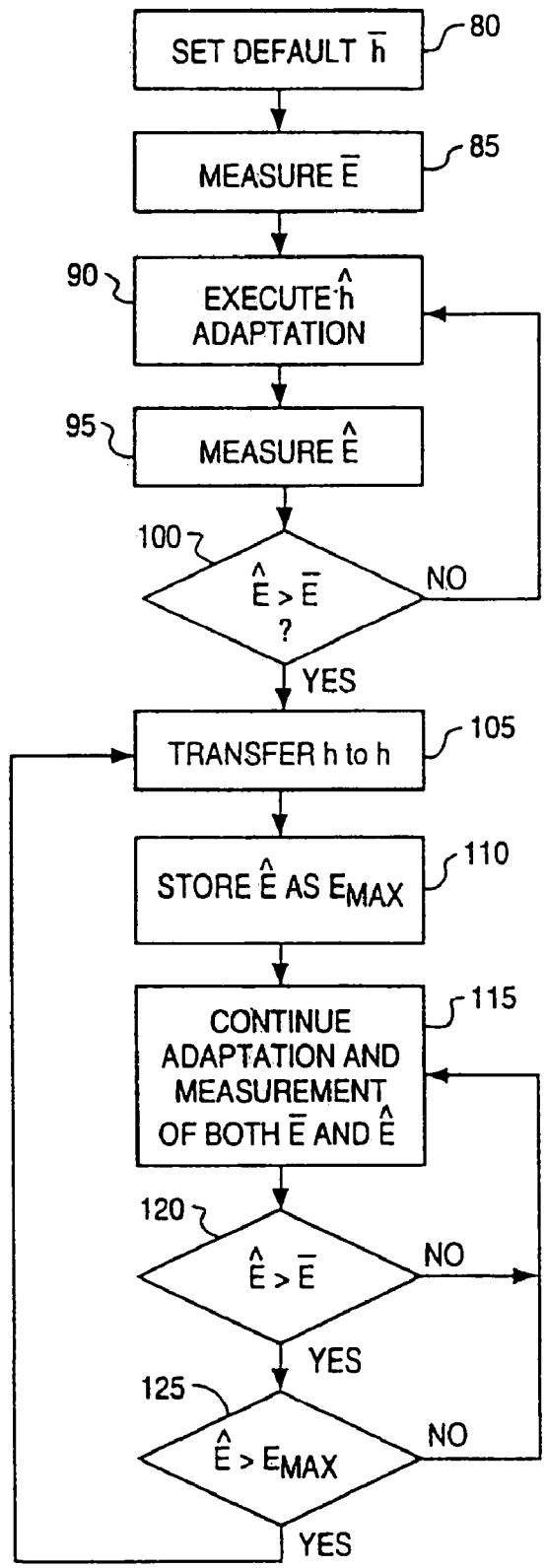
FIG. 3 is a flow chart illustrating one manner of carrying out coefficient transfers in accordance with one embodiment of the present invention.

FIG. 3 illustrates one manner of implementing the echo canceller 25 using the parameters $\hat{E}$ and $\bar{E}$ to control tap coefficients transfers between filter $\hat{h}$ to $\bar{h}$. As illustrated, the echo canceller 25 provides a default $\bar{h}$ set of coefficients at step 80 during the initial portions of the call. After the tap coefficients values for $\bar{h}$ have been set, a measure of $\bar{E}$ is made at step 85 to measure the performance of the tap coefficient values of filter $\bar{h}$.

After the initialization sequence of steps 80 and 85, or concurrent therewith, the echo canceller 25 begins and continues to adapt the coefficients of $\hat{h}$ to more adequately match the echo response h of the overall system. As noted in FIG. 3, this operation occurs at step 90. Preferably, the adaptation is made using a Normalized Least Mean Squares method, although other adaptive methods may also be used (e.g., LMS and RLS).

After a period of time has elapsed, preferably, a predetermined minimum period of time, the echo canceller 25 makes a measure of $\hat{E}$ at step 95. Preferably, this measurement is an averaged measurement. At step 100, the echo canceller 25 compares the value of $\hat{E}$ with the value of $\bar{E}$. If the value of $\hat{E}$ is greater than the value of $\bar{E}$, the tap coefficients of filter $\hat{h}$ are transferred to replace the tap coefficients of filter $\bar{h}$ at step 105. If this criterion is not met, however, the echo canceller 25 will continue to adapt the coefficients of the adaptive filter $\hat{h}$ at step 90, periodically measure the value of $\hat{E}$ at step 95, and make the comparison of step 100 until the condition is met.

Although not illustrated, other transfer conditions may be imposed in addition to the foregoing. For example, the echo canceller may impose a requirement that a far end signal exist before a transfer may occur. Additionally, transfers may be inhibited during a double-talk condition. Further conditions may also be imposed based on system requirements.

If the echo canceller 25 finds that $\hat{E}$ is greater than $\bar{E}$, the above-noted transfer takes place. Additionally, the echo canceller 25 stores the value of $\hat{E}$ as a value $E_{max}$. This operation is depicted as step 110 of the FIG. 3. The value of $E_{max}$ is thus the maximum value of ERLE that occurs over the duration of the call and at which a transfer has taken place. This further value is used thereafter, in addition to the $\hat{E}$ and $\bar{E}$ comparison, to control whether the tap coefficients of $\hat{h}$ are transferred by the transfer controller 65 to replace the tap coefficients of $\bar{h}$. This further process is illustrated that steps 115, 120, and 125 of FIG. 3. In each instance, the tap coefficient transfer only occurs when both of the following two conditions are met: 1) $\hat{E}$ is greater than the current $\bar{E}$, and 2) $\hat{E}$ is greater than $E_{max}$. Each time that both criteria are met, the transfer controller 65 of echo canceller 25 executes the tap coefficient transfer and replaces the previous $E_{max}$ value with the current $\hat{E}$ value for future comparison.

Requiring that $\hat{E}$ be greater than any $\bar{E}$ value used over the course of the call before the coefficient transfer takes place has two beneficial and desirable effects. First, each transfer is likely to replace the prior tap coefficients of filter $\bar{h}$ with a better estimate of the echo path response. Second, this transfer requirement increases the double-talk protection of the echo canceller system. Although it is possible to have positive ERLE $\hat{E}$ during double-talk, the probability that $\hat{E}$ is greater than $E_{max}$ during double-talk decreases as the value of $E_{max}$ increases. Thus an undesirable coefficient transfer during double-talk becomes increasingly unlikely as the value of $E_{max}$ increases throughout the duration of the call.

The echo canceller 25 may impose both an upper boundary and a lower boundary on the value of $E_{max}$. For example, $E_{max}$ may have a lower bounded value of 6 dB and an upper bounded value of 24 dB. The purpose of the lower bound is to prevent normal transfers during double-talk conditions. It has been shown in simulations using speech inputs that during double-talk, a value of greater than 6 dB ERLE was a very low probability event, thus making it an appropriate value for the initial value of $E_{max}$. The upper bound on $E_{max}$ is used to prevent a spuriously high measurement from setting $E_{max}$ to a value at which further transfers become impossible.

The value of $E_{max}$ should be set to, for example, the lower bound value at the beginning of each call. Failure to do so will prevent tap coefficient transfers on a new call until the echo cancellation response of the echo canceller 25 on the new call surpasses the quality of the response existing at the end of the prior call. However, this criterion may never be met during the subsequent call thereby causing the echo canceller 25 to operate using sub-optimal tap coefficients values. Resetting the $E_{max}$ value to a lower value increases the likelihood that a tap coefficient transfer will take place and, thereby, assists in ensuring that the $\bar{h}$ filter uses tap coefficients for echo cancellation that more closely correspond to the echo path response of the new call.

Figure 4:
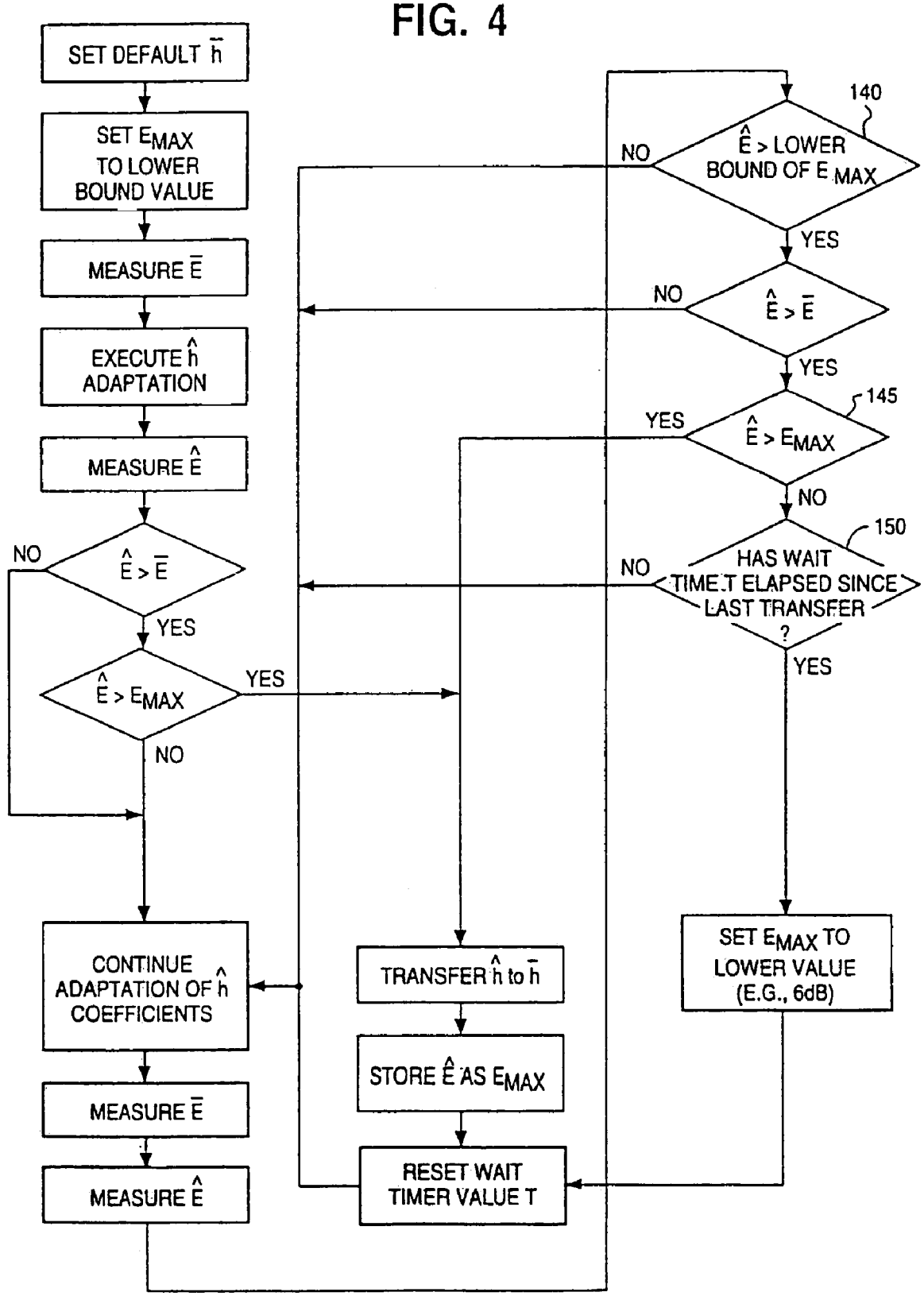
FIG. 4 is a flow chart illustrating a further manner of carrying out coefficient transfers in accordance with a further embodiment of the present invention.

One manner of implementing the $E_{max}$ value change is illustrated in the echo canceller operations flow-chart of FIG. 4. When all transfer conditions are met except $\hat{E}$ greater than $E_{max}$, and this condition persists for a predetermined duration of time, the echo canceller 25 will reset the $E_{max}$ value to, for example, the lower bound value. In the exemplary operations shown in FIG. 4, the echo canceller 25 determines whether $\hat{E}$ is greater than the lower bound of $E_{max}$ at step 140 and less than the current value of $E_{max}$ at step 145. If both of these condition remain true for a predetermined period of time as determined at step 150, and all other transfer criterion have been met the echo canceller 25 resets the $E_{max}$ value to a lower value, for example, the lower bound of the $E_{max}$ value, at step 155. This lowering of the $E_{max}$ value increases the likelihood of a subsequent tap coefficient transfer.

Choosing values for the lower and upper bound of $E_{max}$ other than 6 dB and 24 dB, respectively, is also possible in the present system. Choosing a lower bound of $E_{max}$ smaller than 6 dB provides for a relatively prompt tap coefficient transfer after a reset operation or a new call, but sacrifices some double-talk protection. A value greater than 6 dB, however, inhibits tap coefficient transfer for a longer period of time, but increases the double-talk immunity of the echo canceller. Similarly, varying the value of the predetermined wait time T before which $E_{max}$ is reset may also be used to adjust echo canceller performance. A shorter predetermined wait time T produces faster reconvergence transfers, but may sacrifice some double-talk immunity. The opposite is true for larger predetermined wait time values.

A further modification of the foregoing echo canceller system relates to the value stored as $E_{max}$ at the instant of tap coefficient transfer. Instead of setting $E_{max}$ equal to the $\hat{E}$ value at the transfer instant, $E_{max}$ may be set to a value equal to the value of $\hat{E}$ minus a constant value (e.g., one, three, or 6 dB). At no time, however, should the $E_{max}$ value be set to a value that is below the lower bound value for $E_{max}$. Additionally, a further condition may be imposed in that a new softened $E_{max}$ is not less than the prior value of $E_{max}$. The foregoing "softening" of the $E_{max}$ value increases the number of transfers that occur and, further, provides more decision-making weight to the condition of $\hat{E}$ being larger than $\overline{E}$.

As will be readily recognized, the echo canceller of the present invention may be implemented in a wide range of manners. Preferably, the echo canceller system is implemented using one or more digital signal processors to carry out the filter and transfer operations. Digital-to-analog conversions of various signals are carried out in accordance with known techniques for use by the digital signal processors.

There are some circumstances when the foregoing transfer criterion should be defeated. For example, the transfer criterion is preferably defeated when 1) the long-term ERLE remains low, and 2) a small but measurable performance advantage of $\hat{h}$ over $\overline{h}$ is sustained over a long period of time.

One case in which it should be defeated is when the steady-state ERLE remains below the lower value of $E_{max}$. Such a case may occur when there is a high-level, constant background noise entering from the near-end which may lower the measured ERLE considerably. Since the foregoing process prevents transfers from occurring unless the ERLE is greater than the lower bound of $E_{max}$, no transfers are possible in low ERLE situations. Since the $\overline{h}$ may contain the solution to a previous call at the start of a new, low ERLE call, defeating the foregoing transfer criterion is preferable in some cases.

The first condition for defeating the foregoing transfer criterion is a sustained low ERLE measurement over a relatively long period of time (e.g. 150 to 500 msec) of adaptation. Since a low ERLE call will tend to have a smaller difference between the ERLEs of $\overline{h}$ and $\hat{h}$ (a 1 dB difference may be the largest difference observed), the required ERLE difference between $\hat{h}$ and $\overline{h}$ for a transfer to occur should be reduced (e.g. to 0 or 1 dB) once the long-term ERLE is confirmed to be low. To compensate, a requirement may be imposed whereby the small ERLE difference between $\overline{h}$ and $\hat{h}$ is maintained for a long period of time (e.g. 75 to 200 msec) before the transfer is allowed.

Each of the filters $\hat{h}$ and $\overline{h}$ preferably include one or more D.C. taps to compensate for non-linearities in the echo path response. The result is that the filters can model a D.C. shift quite accurately, and high ERLE can be achieved despite the presence of a D.C. non-linearity.

More complex non-linearities in the echo path response generally require more complex non-linear processing. One manner in which the echo canceller 25 can process such non-linearities is set forth in application Ser. No. 08/970,228, filed Nov. 14, 1997, titled "Echo Canceller Employing Dual-H Architecture Having Improved Non-Linear Echo Path Detection" now U.S. Pat. No. 6,028,929, the teachings of which are hereby incorporated by reference. A further manner in which the echo canceller may compensate for non-linearities is by directing switch 45 to use the $\hat{h}$ filter to cancel the echo. This is due to the fact that the $\hat{h}$ filter is more time responsive to the non-linearities since the NLMS adaptation process attempts to find the best short term solutions for the non-linearities in the echo path so as to maximize ERLE even where the short tern solutions diverge from the long-term linear response.

The present inventors have recognized that a difference in the number of coefficient transfers from $\hat{h}$ to $\overline{h}$ occurs depending on whether or not the echo path has a non-linear component. When the echo path has an entirely linear response, the tap coefficients of $\hat{h}$ generally reflect the linear impulse response of the echo path. In a non-linear echo path having a non-linear residual echo signal, the residual echo will tend to increase when compared to the linear response. In an attempt to reduce this residual echo, the tap coefficients of $\hat{h}$ move, for short periods of time, away from the linear impulse response to maximize the short-term ERLE. This occurs since the tap coefficients are adapted using a Least Mean Squares adaptation process which constantly tries to minimize the short term ERLE. As the non-linearity of the echo signal increases, the effect of the tap coefficients moving away from their original linear position to gain short term improvements becomes more pronounced.

For linear echo paths, the operational logic of the echo canceller 25 assumes that a number of transfers will occur at the beginning of the call as the echo canceller 25 adjusts the taps to the model echo path response and transfers the model to the $\overline{h}$ filter. After the initial convergence period, the expected number of transfers per unit time will become small if the echo path is truly linear. Conversely, the best cancellation solution varies with time for non-linear calls when using a linear echo canceller. As a result, the non-adaptive taps of the $\overline{h}$ filter quickly become sub-optimal when compared to the $\hat{E}$ value of the $\hat{h}$ filter response. For example, the $\overline{h}$ coefficients may become suboptimal as compared to $\hat{h}$ within about 50 milliseconds. As a result, the transfer density, i.e. the number of transfers per unit time, becomes large and continues to stay large throughout the entire call.

With foregoing in mind, the echo canceller 25 measures the transfer density after a convergence period to determine whether the echo path response is linear or non-linear. To this end, the echo canceller 25 is programmed to store a transfer density threshold value TDT. The echo canceller 25 maintains a count of the number of transfers TC that occur over a known period of time. This count is compared to the transfer density threshold value TDT. If this count TC, and thus the transfer density, exceeds the transfer density threshold value TDT, the echo canceller 25 declares the presence of a non-linear echo path response and executes the appropriate operations needed to cancel the echo signal. If the count TC, and thus the transfer density, is below the threshold value TDT, the echo canceller 25 handles the echo cancellation as a linear echo cancellation.

The value of TC may be calculated in a number of different manners. It may be calculated using a software counter that is read on a predetermined periodic basis at intervals T and that is reset immediate after being read. The resulting count may be directly used and compared to the transfer density threshold value TDT. In such instances, the value of the transfer density threshold value TDT is selected based on the period used to read the software counter.

In a more complicated process for determining the value of TC, the time at which a software counter is read and the corresponding counter value are stored and memory. During a subsequent reading of the counter value, both the counter value and the time at which the counter is subsequently read are noted. The value of TC may then be calculated as the difference between the initial and final counter values divided by the difference between the initial and final time values.

The value of TC may also correspond to an averaged transfer density value. In such instances, the value TC may be calculated using a digital filter which calculates a moving average of the number of transfers per unit time. Such a filter preferably has, for example, a slow attach time constant and fast decay time constant, although this is not mandatory. A value of 1 is supplied to the averaging filter each time a transfer takes place during a frame having a predetermined period. A value of 0 is supplied to the averaging filter each time a transfer does not take place during the frame. When the output of the averaging filter exceeds the threshold value TDV, a non-linear condition is declared.

Figure 5:
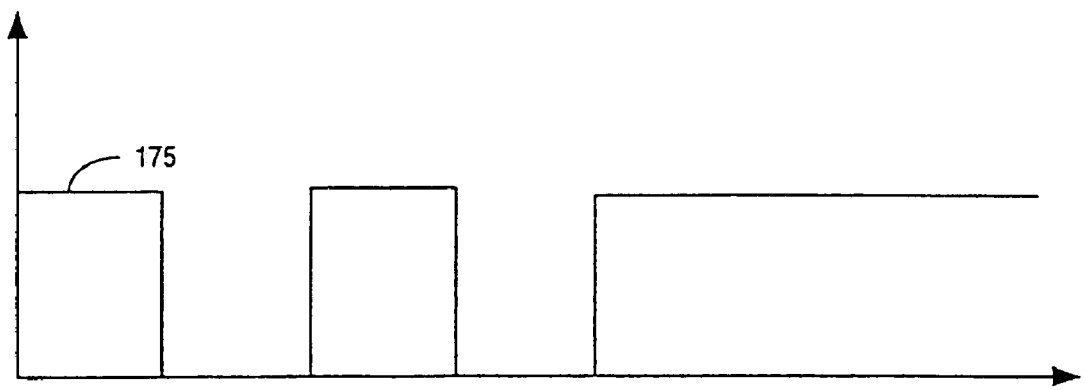
FIG. 5 illustrates the input and output of a filter that may be used to assist in measuring transfer density.
Figure 5:
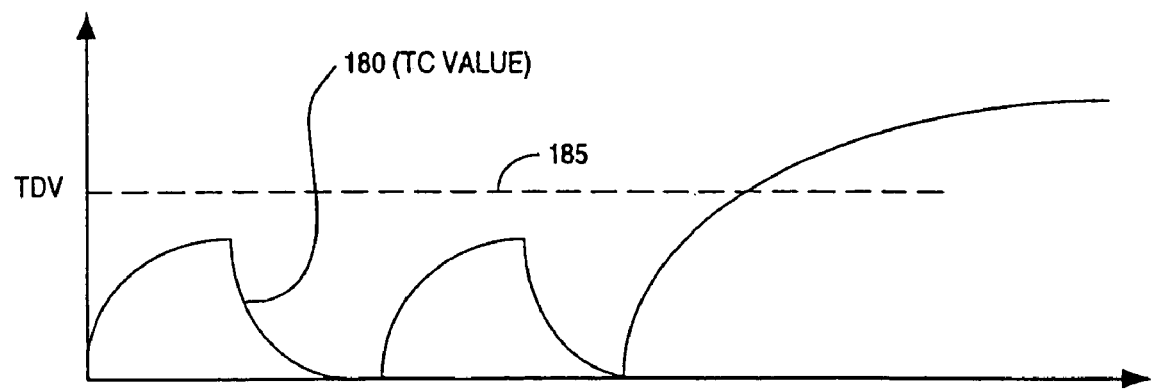

Such a situation is illustrated in FIG. 5. As shown, a value of 1 is applied to the filter input during each frame in which a transfer has taken place. A value of 0 is provided to the filter input if no transfer has taken place during the frame. The input value is illustrated at line 175 while the output value is illustrated at line 180. When this output value exceeds the threshold value TDV, designated at line 185, a non-linear condition is declared. The foregoing filter configuration may be implemented in hardware. However, it is preferably implemented in the software of one or more digital signal processors used to implement the echo canceller 25.

Figure 6:
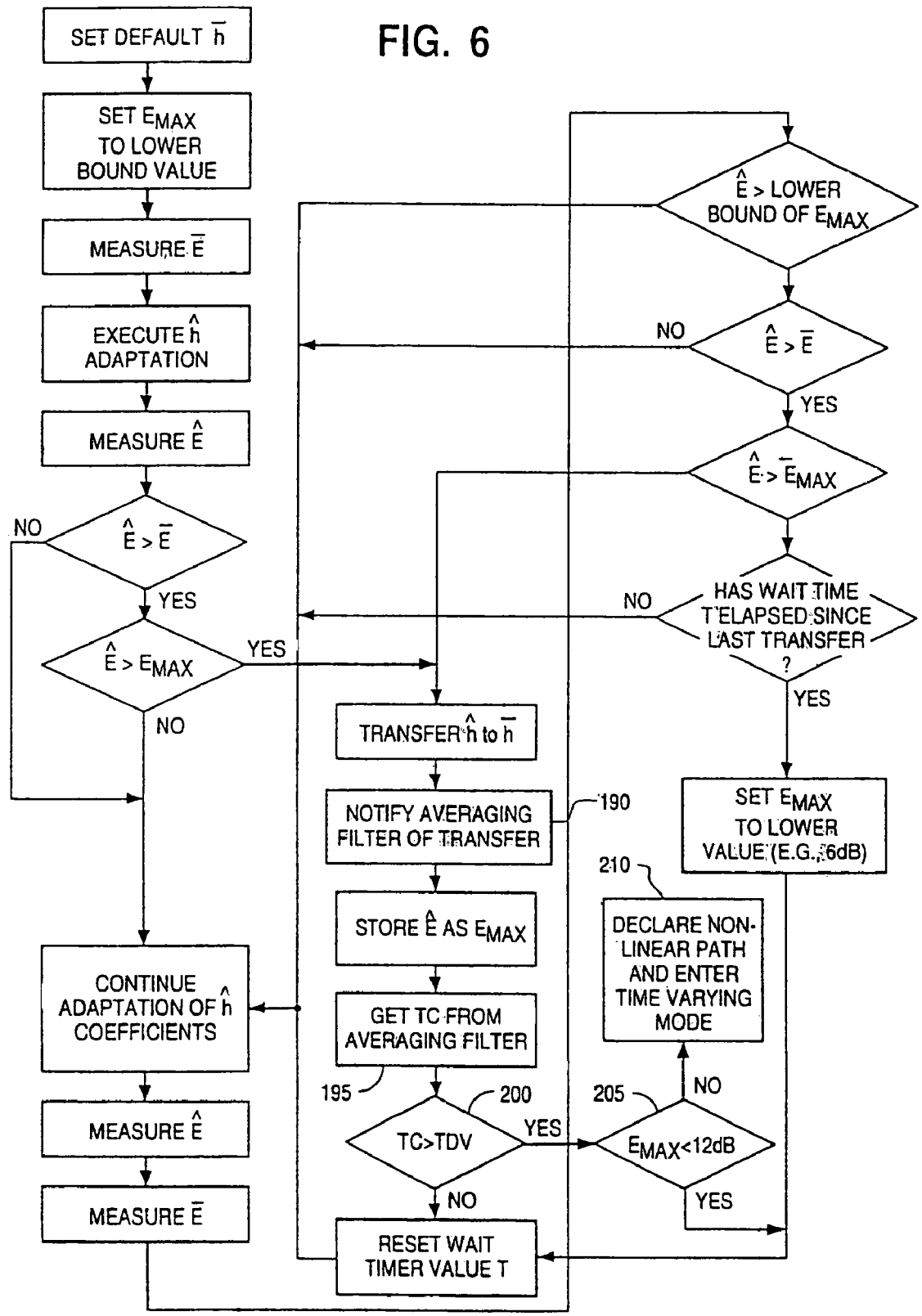
FIG. 6 illustrates one manner of implementing non-linear echo path detection in the echo canceller operations previously described in connection with FIG. 4.

One manner of incorporating the foregoing threshold detection process in the operations of the process of FIG. 4 is illustrated in FIG. 6. As illustrated, the averaging filter is notified at step 190 that a transfer has taken place. The resulting filtered value is retrieved at step 195 and compared to the threshold value at step 200. If the threshold value TDV is exceeded, the Emax value is checked at step 205 to ensure that it is above a threshold value (e.g., 12 dB) before a non-linear echo path condition is declared. If Emax is below this value, no such declaration is made. This check to ensure that the Emax value is greater than a predetermined value assists in ensuring that a non-linear echo path condition is not declared during periods of convergence and reconvergence of the adaptive filter. If Emax is above this value, a non-linear echo path response is declared at step 210.

A further manner for detecting non-linearities using one or more characteristics of the filter h is illustrated in connection with FIGS. 7 and 8. In accordance with this further manner, the time dispersion of the tap coefficient values is used to determine whether the echo path is linear or non-linear.

Figure 7:
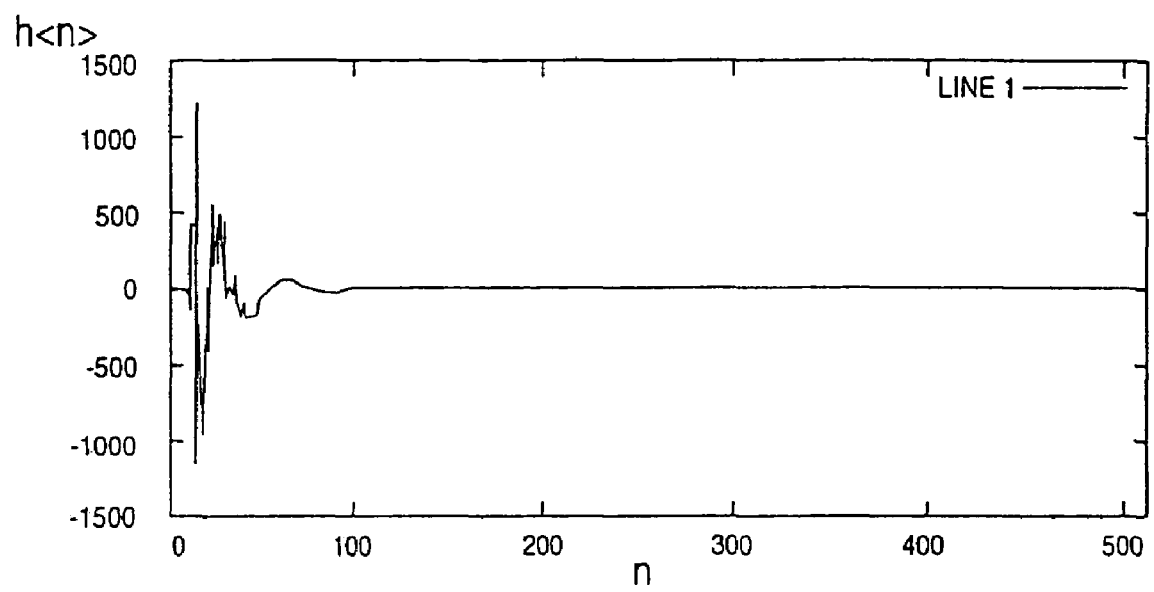
FIG. 7 illustrates tap coefficient time dispersion for the adaptive filter when responding to a linear echo path.

A graph of the tap coefficients of the $\tilde{h}$ filter with respect to the time delay associated with each tap is illustrated in FIG. 7 for a linear echo path response. As shown, the $\tilde{h}$ response is comprised of a small number of large magnitude taps (shown here as those taps numbered 0 to 100) and many taps that are near 0 (shown here as taps numbered 101 to 511). Other linear echo paths generally yield similar results wherein a small percentage of the total number of taps are used to model the echo response and a large number of taps have coefficients that are approximately equal to 0. As such, the $\tilde{h}$ coefficients have a generally small time dispersion value (i.e., the majority of the energy of the $\tilde{h}$ coefficients is confined to a small window of time).

Figure 8:
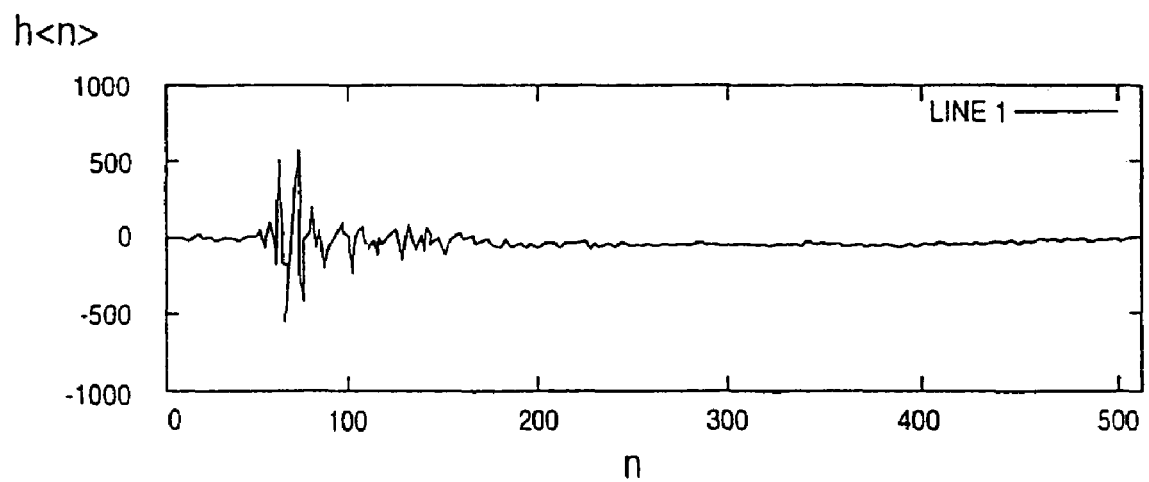
FIG. 8 illustrates tap coefficient time dispersion for the adaptive filter when responding to a non-linear echo path.

FIG. 8 illustrates the coefficient values of $\tilde{h}$ when attempting to model the echo response of a non-linear echo path. In this case, the ratio of the number of taps having large tap coefficients to the number of taps having low value tap coefficients is not as large as it was in the linear case of FIG. 7. The energy of the taps of $\tilde{h}$ is more widely dispersed among the taps. The relatively lower value tap coefficients are much larger in the non-linear case since they are playing an active role in finding short-term solutions for canceling the non-linear components of the echo. As such, the $\tilde{h}$ coefficients have a generally large time dispersion value when attempting to model a non-linear echo path (i.e., the tap energy is dispersed over a large number of taps).

In view of the foregoing characteristics recognized by the present inventors, the echo canceller 25 calculates the time dispersion of the tap coefficients of the $\tilde{h}$ filter to determine whether the echo path is linear or non-linear. The time dispersion value is compared to a threshold. The threshold depends on the method of measuring the time dispersion and can be chosen experimentally. When the time dispersion value moves above the threshold, a non-linear echo path is declared. Otherwise, the echo path is assumed to be linear. Hysteresis can be used in making this determination.

The time dispersion value can be calculated in many ways. In accordance with one manner, the echo canceller may find the inverse of the fraction of the total tap energy which can be attributed to the largest M taps, where M is a small number compared to the total number of taps in the $\tilde{h}$ filter. In accordance with a further manner of calculating time dispersion, the echo canceller may measure the ratio of the L lowest tap coefficients to the number M of the largest tap coefficients. However it is measured, the time dispersion will be larger for non-linear calls than for linear calls.

The time dispersion process of the echo canceller 25 can be augmented with a few other processes to improve its accuracy. For example, the echo canceller 25 may require that the time dispersion value remain above the threshold for a predetermined period of time before a non-linear echo path is declared. Such a requirement assists in preventing a period of convergence and reconvergence, which also might be characterized with large time dispersion values, from falsely tripping the non-linear detector process. Still further, the echo canceller may require that a measurement of the background noise be made prior to declaring a non-linear echo path. High levels of background noise may increase the time dispersion thereby causing a false indication of non-linearity. The echo canceller 25 may be programmed to require both a low background noise condition and a high time dispersion value above the threshold before declaring the presence of a non-linear echo path.

Figure 9:
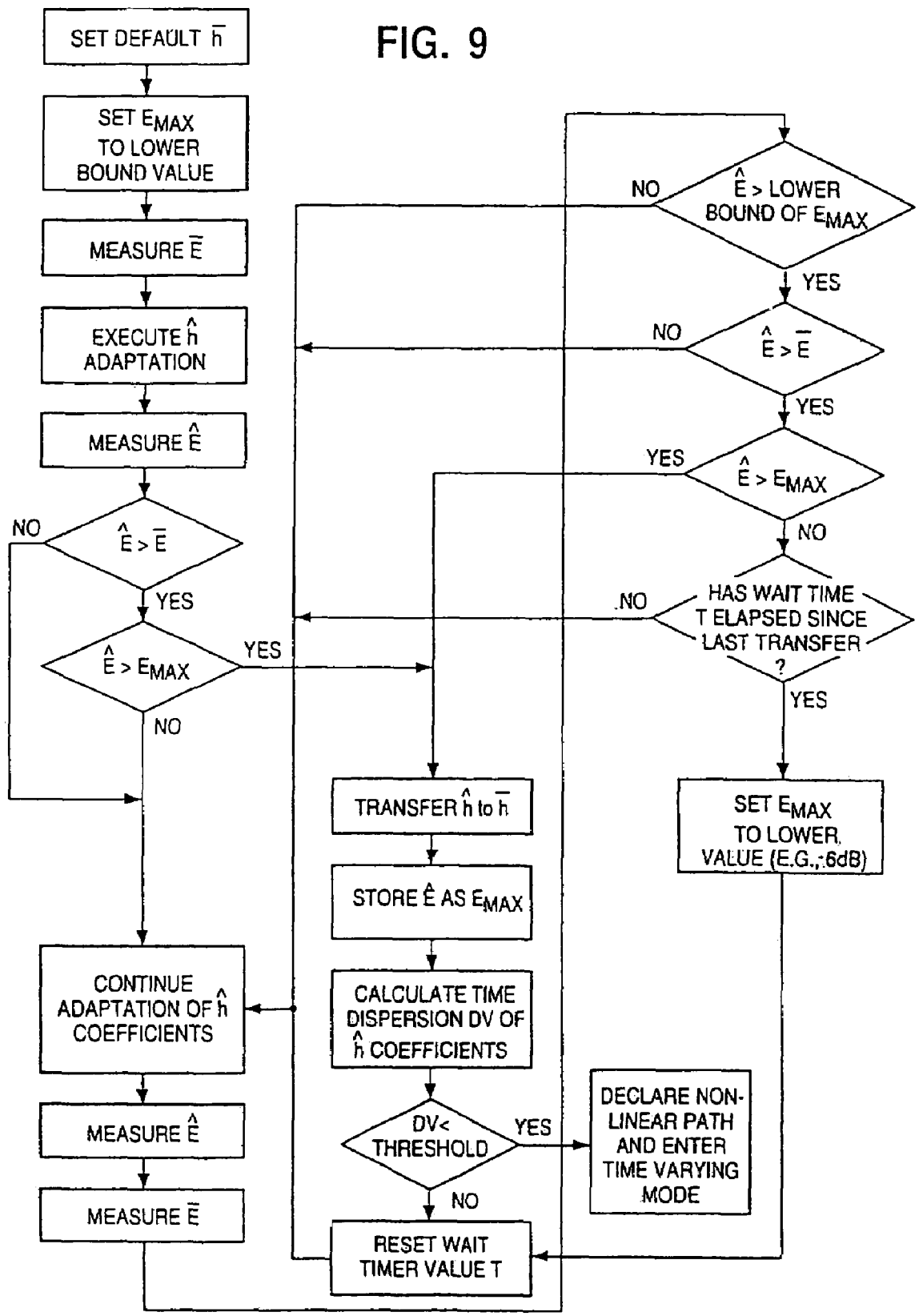
FIG. 9 illustrates one manner of implementing a non-linear detector using time dispersion as applied to the echo canceller operations of FIG. 4.

One manner of implementing the time dispersion process in the process shown in FIG. 4 is illustrated in FIG. 9.

When a non-linear echo path is detected, the echo canceller 25 preferably enters a time varying mode. In this mode, the output decision logic is biased to use the $\tilde{h}$ filter to compensate for the echo response. This may be accomplished, for example, by transferring switch 45 so that the $\tilde{h}$ output is consistently used for the echo compensation. Alternatively, this bias may be accomplished by varying the $\tilde{h}$ to $\bar{h}$ transfer criterion discussed above so as to make the transfers more likely to occur. Additionally, the adaptation gain used to adapt the tap coefficients of $\tilde{h}$ is preferably lowered so as to reduce the rate at which the tap coefficients change and prevent overshoot of short term solutions. Further, any split adaptation of the tap coefficients is inhibited in time varying mode. Such split adaptation is shown and described in application Ser. No. 08/970,229, filed Nov. 14, 1997, titled "Echo Canceller Employing Dual-H Architecture Having Split Adaptive Gain Settings", now U.S. Pat. No. 6,240,180.

A further manner of detecting non-linearities based on the adapted coefficients is to monitor the variance of each of the taps over time. A large tap variance indicates non-linearities while a low tap variance indicates a linear echo path response.

Irrespective of the manner used to declare the presence of a non-linear echo path response in the channel, some manner of canceling non-linearities in the echo response is needed. To this end, the echo canceller 25 is provided with a non-linear processor, shown generally at 300 of FIG. 2.

Figure 10:
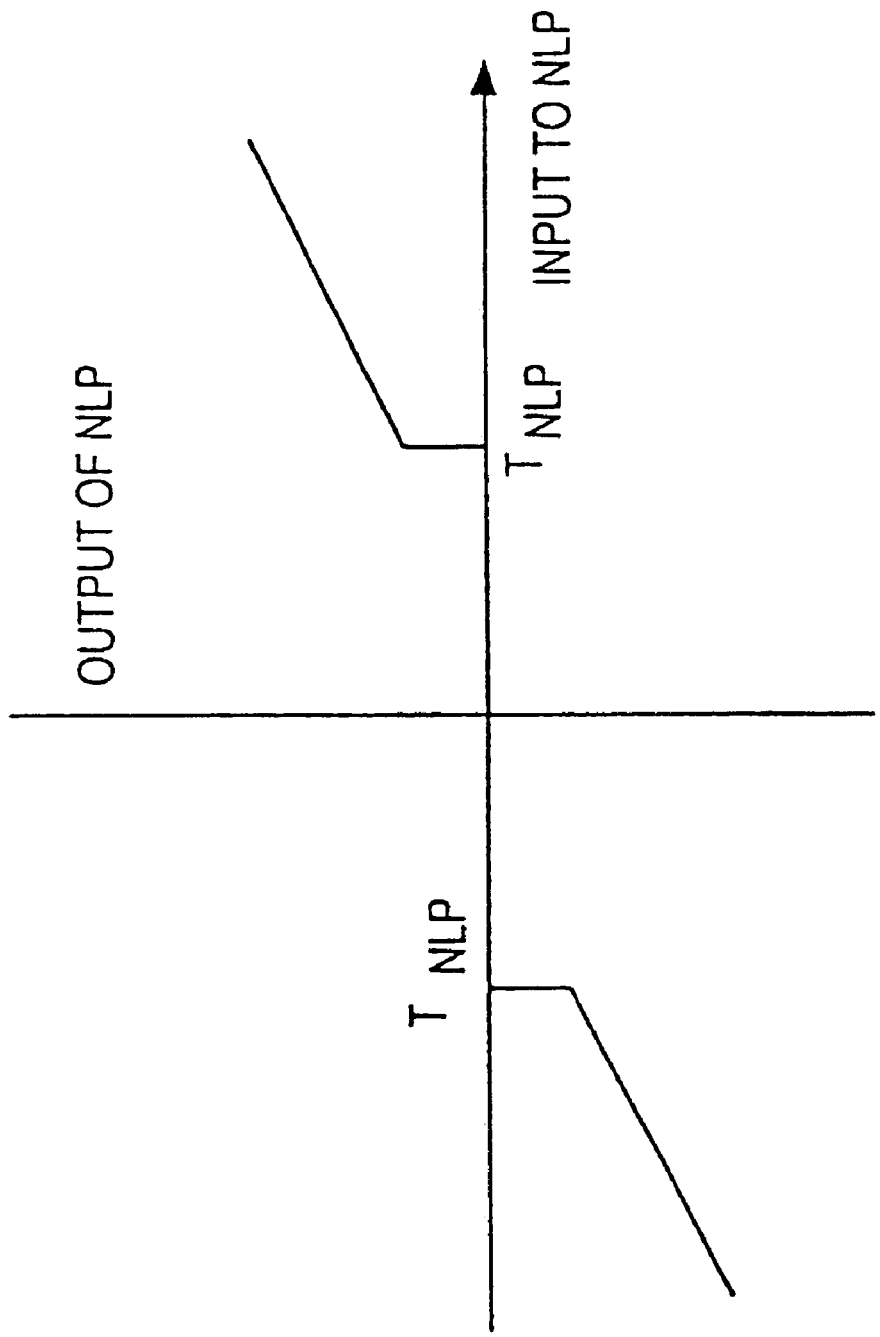
FIG. 10 is a graph of an input signal to the output signal of one embodiment of the non-linear processor.

The NLP 300 works by reducing small input signals to zero while leaving larger input signals relatively unchanged. To accomplish this, the NLP 300 includes a center clipping filter. The output of the NLP 300 as a function of the input thereto is illustrated in FIG. 10. An input signal having an amplitude less than or greater than a calculated NLP threshold $T_{NLP}$ will be reduced to zero at the output of the NLP 300. Larger amplitude signals are modified only near their zero crossings. Alternatively, the NLP 300 may be designed in accordance with the response of the non-linear processor of U.S. Pat. No. 5,274,705, titled "Nonlinear Processor for an Echo Canceller", which is hereby incorporated by reference.

Figure 11A:
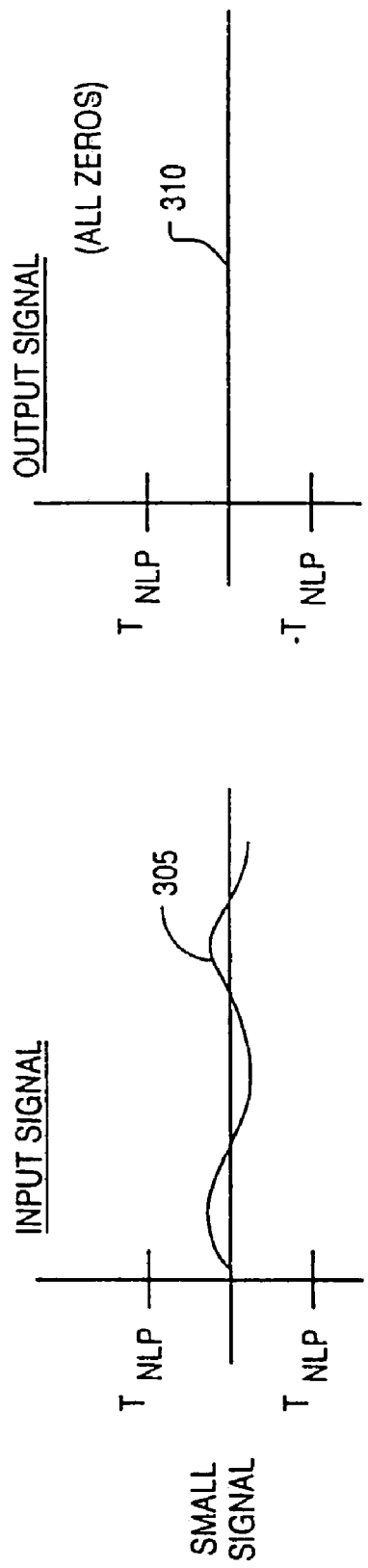
FIGS. 11a and 11b illustrate the response of the non-linear processor to small signal and large signal inputs respectively.
Figure 11B:
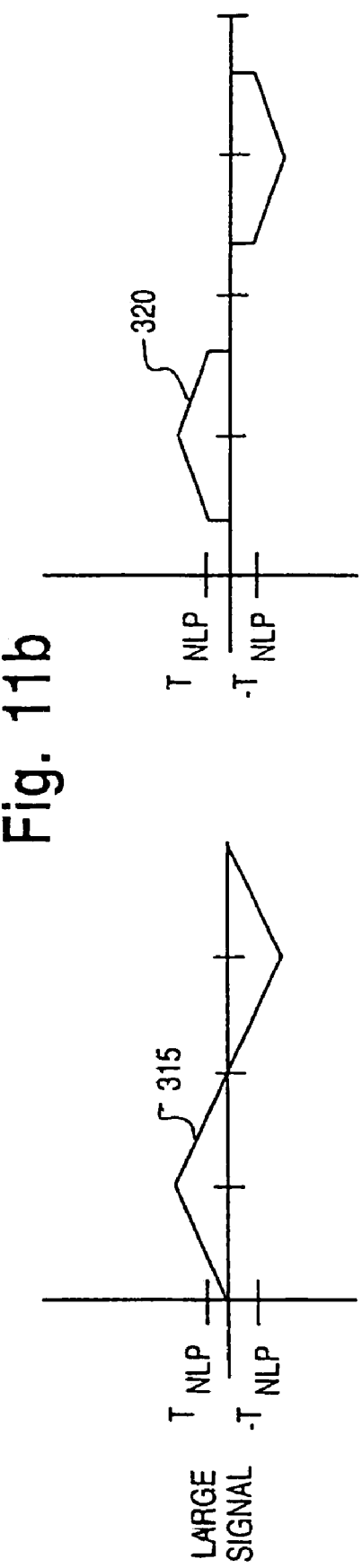

FIG. 11a illustrates a small signal input to the NLP 300 at 305 and the resulting output signal at 310. Similarly, FIG. 11b illustrates a large signal input to the NLP 300 at 315 and the resulting output signal at 320. Note that the resulting output signal is clipped at amplitudes between $-T_{NLP}$ and $+T_{NLP}$.

To be generally effective, the NLP 300 should set $T_{NLP}$ larger than the amount of non-cancellable echo. This provides the end user with the experience of "echo-free" performance. However, the value of $T_{NLP}$ should not be set to a value any greater than necessary so as to minimize distortion of larger signals.

Figure 12:
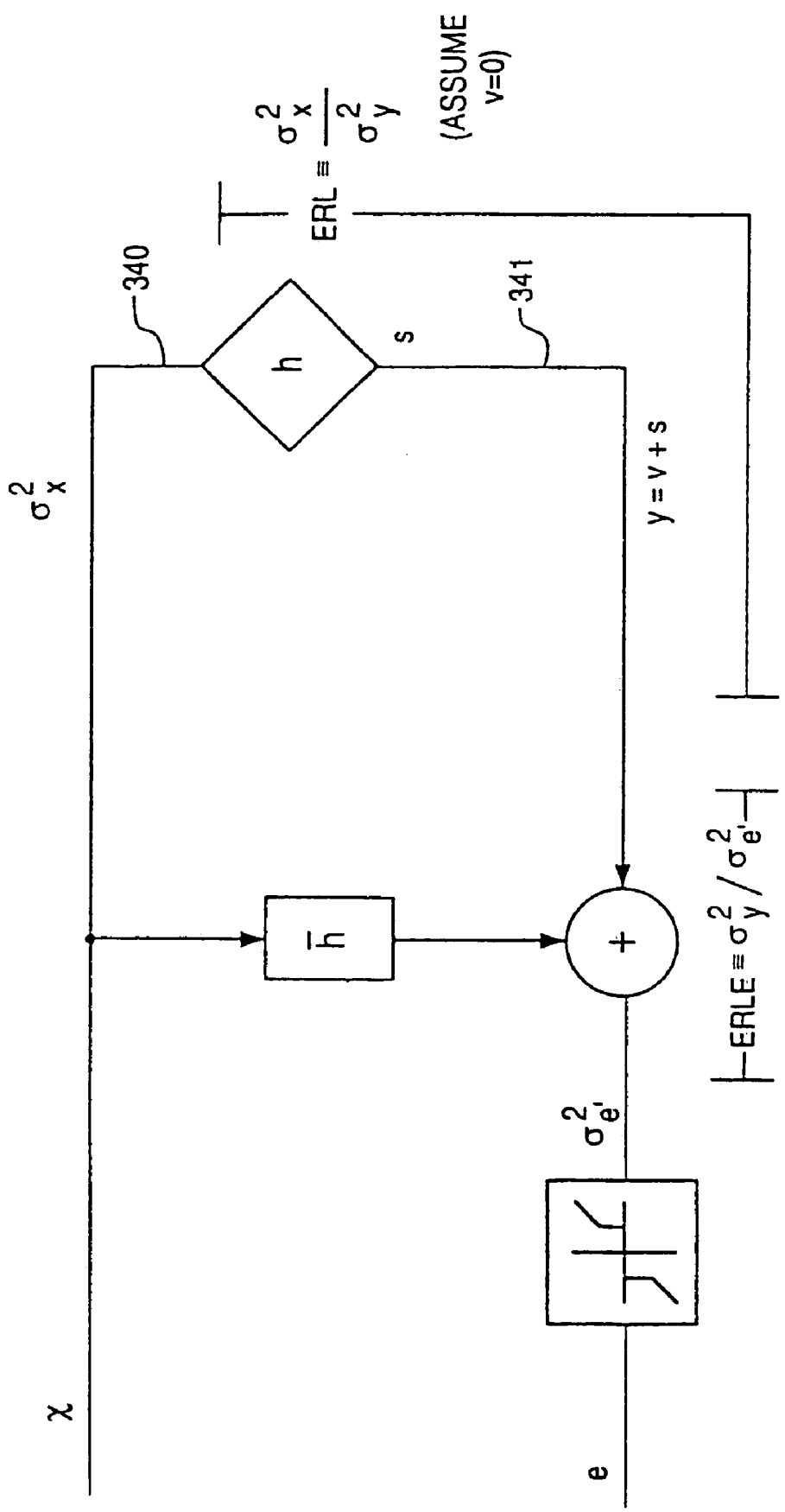
FIG. 12 illustrate various quantities from which $T_{NLP}$ may be calculated.

The value of $T_{NLP}$ may be obtained by estimating the power of $\sigma_e^2$ from measurable echo canceller quantities (note that $\sigma_e^2 = \text{pow}(e')$). Such quantities are set forth in FIG. 12 in connection with a standard linear echo canceller. To this end, the echo canceller 25 measures the power of the X, $\sigma_x^2$ signal and subtracts the difference in power across lines 340 and 341 from the measured quantities (e.g., the echo return loss or "ERL"). The echo canceller 25 then subtracts the power decrease due to the echo canceller 25, which is ERLE, from the calculated difference. The result is an estimate of $\sigma_e^2$, which is expressed as $\tilde{\sigma}_{e'}^2$ (note that $\tilde{\sigma}_{e'}^2 = \text{pow}(e)$) far. This corresponds to the following equations:

$$\tilde{\sigma}_{e'}^2 = \sigma_x^2 \cdot \underbrace{\frac{\sigma_y^2}{\sigma_x^2}}_{ERL^{-1}} \cdot \underbrace{\frac{\sigma_{e'}^2}{\sigma_y^2}}_{ERLE^{-1}} \quad \text{(assuming } v = 0\text{)}$$

or in terms of dB $\tilde{\sigma}_{e'}^2$ (in dB)$=\sigma_x^2$ (in dB)$-ERL$ (in dB)$-ERLE$ (in dB)

Once the estimate $\tilde{\sigma}_{e'}^2$ has been made, the echo canceller 25 may then set the value of $T_{NLP}$ equal to or slightly higher than $\tilde{\sigma}_{e'}^2$. Assuming that $T_{NLP}$ is set to slightly overbound $\tilde{\sigma}_{e'}^2$, the far-end user should hear no residual echo with only minimal distortion to the near end speech.

It is possible, but not necessary, to use $E_{MAX}^{-1}$ as an estimate of $ERLE^{-1}$ in determining $\tilde{\sigma}_{e'}^2$. In calculating ERL, it is possible, but not necessary to instead calculate ERL using the following equation:

$ERL = \text{pow}(x_{max})/\text{pow}(y)$ where $x_{max}$ is the maximum value of x over the last L seconds, where L is a constant.

Measurements of ERL and ERLE and, thus, $\tilde{\sigma}_{e'}^2$, will likely be erroneous if a double-talk condition exists when these measurements are taken. During periods of double-talk, the measured ERLE≈0 dB and the measured ERL is very small, perhaps negative. The resulting $\tilde{\sigma}_{e'}^2$ would be much larger than desired, thus setting $T_{NLP}$ too high and causing severe distortion of the near-end speaker's voice as perceived at the far-end.

Steps are taken to ensure that the $T_{NLP}$ value is not modified during double talk. Preferably, double-talk detection is implemented in accordance with the teachings of application Ser. No. 08/971,116, filed Nov. 14, 1997, titled "Echo Canceller Employing Dual-H Architecture Having Improved Double-Talk Detection" now, U.S. Pat. No. 6,266,409 Even more preferably, the double-talk detection is implemented in the manner set forth in FIG. 13.

The double-talk detector 400 compares long-term and short-term averages of the error power. The long-term average is computed in such a way that it can be considered a steady-state measure of the residual error. When the short-term measure of the error power noticeably exceeds the long term measure (e.g. by 3 or 6 dB), it is assumed that e' signal no longer contains only residual echo, but in addition, near-end speech. This event thus triggers a double talk event.

Figure 13:
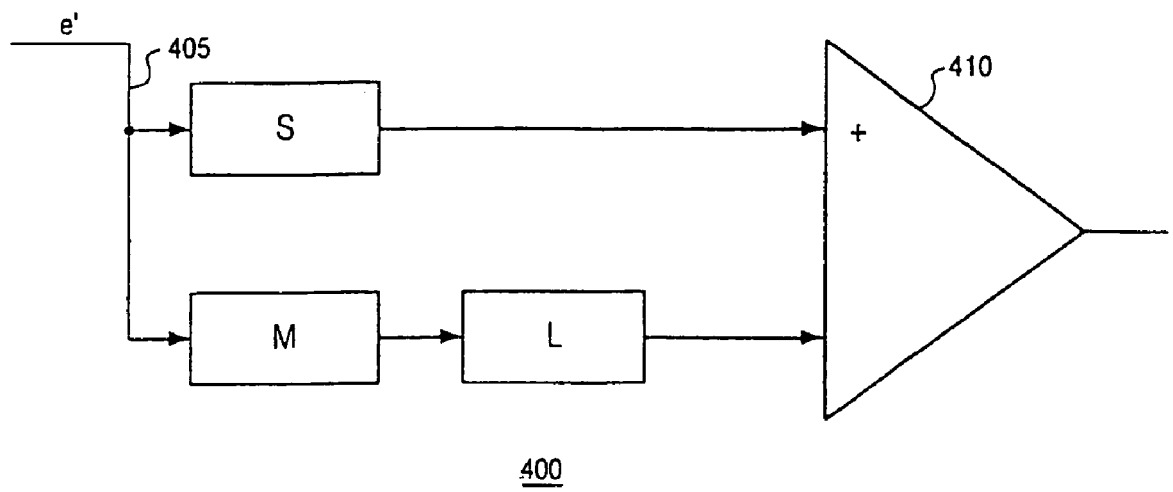
FIG. 13 illustrates one manner of implementing a double talk detector in the non-linear processor.

As illustrated in FIG. 13, the double-talk detector 400 employs at least two measurements of the average echo power that are compared with one another wherein each measurement corresponds to a different averaging time. In the illustrated embodiment, three measurements of the average echo power are employed, each using a different window of time in which it performs its averaging function. From an implementation standpoint, it is convenient to translate these various averaging window lengths into the time constants of averaging filters; longer averaging windows translate into longer time constants. To this end, the double-talk detector 400 employs a short time constant filter S, a medium time constant filter M, and a long time constant filter L.

The S filter simply uses a short time constant, e.g. 2 to 7 msec, to average e' which is supplied at input line 405. The M filter uses a medium time constant, e.g. 12 to 36 msec to average e'. The computation of L is slightly more complex. In the illustrated embodiment, L averages M, not e' directly. When M≧L, L averages M with a very long time constant (e.g. 500-2000 msec). When M<L, then L averages M with a much smaller time constant. The net effect is the L and M form a dual time constant filter in which the output of L increases very slowly but decreases very quickly. The resulting filter is a "slow attack, fast decay" average of M.

Figure 14:
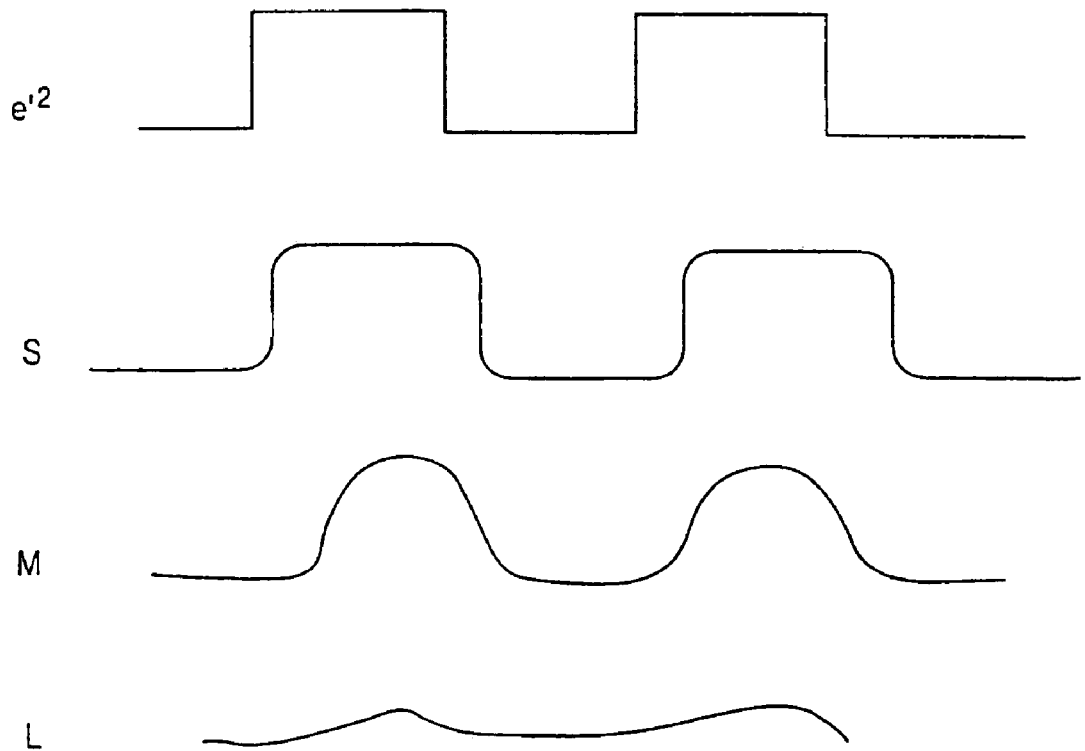
FIG. 14 illustrates a signal input e' and the corresponding output signals from filters S, M, and L of FIG. 13.

FIG. 14 illustrates a signal input e' and the corresponding output signals from filters S, M, and L. The output signals of filters S and L are provided to the input of comparator 410. The output of filter L serves to maintain the lower bound of e'. When the comparator 410 detects that the output signal of filter S is noticeably larger than the output signal of filter L, a double-talk condition is declared.

The foregoing double-talk detector is preferably implemented in software code of one or more digital signal processors used to implement the echo canceller 25. When a double-talk condition is declared, the $T_{NLP}$ value is preferably locked and no further modifications thereof are made until the double-talk condition is no longer present.

As noted above, the echo return loss ERL measurement is used to ultimately arrive at a value for $T_{NLP}$. However, this measurement may be significantly corrupted during a double-talk condition thereby impacting the value of $T_{NLP}$. To further reduce the likelihood of such corruption, the non-linear processor 300 of the echo canceller 25 preferably locks the ERL value without further calculation thereof once the processor 300 has determined that the ERL is at a generally static value.

One method that may be used to measure ERL involves mapping the measured value to a magnitude in a look-up table. The magnitude of the x signal is divided by the magnitude of the y signal. This ratio is then quantized to the closest member of a pre-defined set by way of the look-up table. For example, let the pre-defined set by $\{0, 3, 6, 9, \ldots, 30\}$ dB, and let $\sigma_x^2/\sigma_y^2$=7.1 dB. Then the measured ERL would map to the set member 6 dB. On the next instance, let $\sigma_x^2/\sigma_y^2$=5.61 dB. This too would map to 6 dB.

Now consider the situation where several consecutive amplitude ratios map to the same value. If this continues for a period of time, the echo canceller 25 may accept that the estimate of the ERL is valid for the remainder of the call. Locking in this estimate of ERL means that future instances of double-talk cannot corrupt the estimate of ERL, and thus $T_{NLP}$ is less likely to be corrupted during double talk.

To this end, a counter is incremented if the current table look-up produces the same result as the previous look-up. This counter is cleared if any of the following conditions occur: 1) a different look-up result occurs; 2) the far-end goes silent for a substantial period of time; 3) double talk is detected (e.g. by the averaging filter comparison above); or 4) other conditions are detected that will likely skew the ERL measurement.

If the counter reaches a predetermined large value (e.g. 500 to 2000 msec), and ERL Lock condition is declared and the current ERL estimate is used without further look-ups or calculations thereof. The ERL Lock is lifted if an endpath switch is detected by the echo canceller indicating that a call has terminated.

Figure 15:
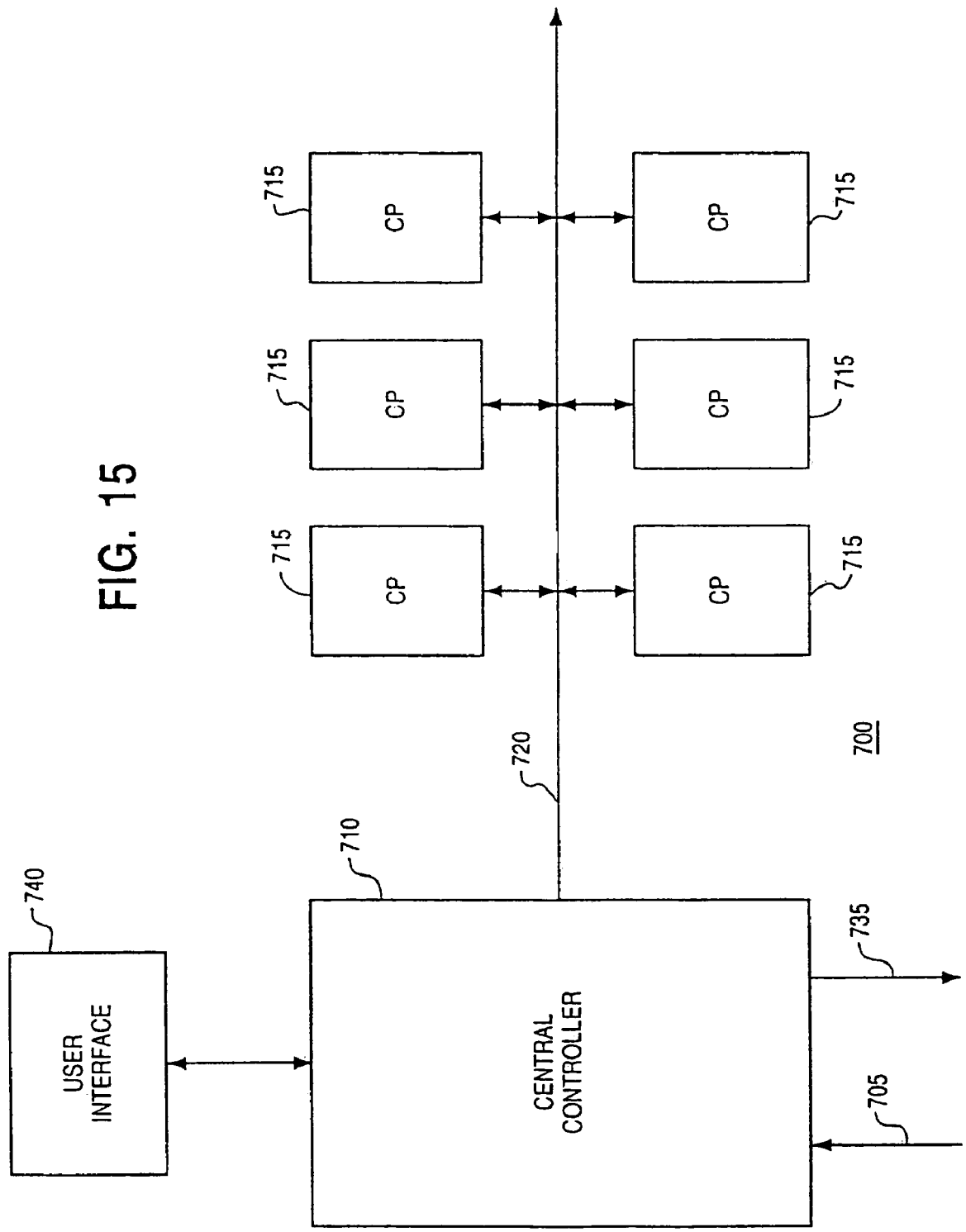
FIG. 15 illustrates one manner of implementing an echo canceller system employing the present invention.

FIG. 15 illustrates one embodiment of an echo canceller system, shown generally at 700, that maybe used to cancel echoes in multi-channel communication transmissions. As illustrated, the system 700 includes an input 705 that is connected to receive a multi-channel communications data, such as a T1 transmission. A central controller 710 deinterleaves the various channels of the transmission and provides them to respective convolution processors 715 over a data bus 720. It is within the convolution processors 715 that a majority of the foregoing operations take place. Each convolution processor 715 is designed to process at least one channel of the transmission at line 730. After each convolution processor 715 has processed its respective channel(s), the resulting data is placed on the data bus 720. The central controller 710 multiplexes the data into the proper multichannel format (e.g., T1) for retransmission at line 735. User interface 740 is provided to set various user programmable parameters of the system.

Numerous modifications may be made to the foregoing system without departing from the basic teachings thereof. Although the present invention has been described in substantial detail with reference to one or more specific embodiments, those of skill in the art will recognize that changes may be made thereto without departing from the scope and spirit of the invention as set forth in the appended claims.

What is claimed is:

1. A method for echo cancellation comprising:
   modifying a non-linear threshold value $T_{NLP}$ based on an echo return loss value;
   center clipping an echo compensated signal at amplitudes between $+T_{NLP}$ and $-T_{NLP}$; and
   locking the echo return loss value when an echo return loss measurement remains static over a number of echo return loss measurements.

2. The method of claim 1, further comprising receiving the echo compensated signal.

3. The method of claim 1, further comprising determining the echo return loss value.

4. The method of claim 3, wherein determining the echo return loss value comprises mapping the echo return loss measurement to a member in a pre-defined set of echo return loss values.

5. The method of claim 1, further comprising measuring an echo return loss to obtain the echo return loss measurement.

6. The method of claim 1, further comprising withholding modification of the $T_{NLP}$ during double-talk.

7. The method of claim 6, further comprising detecting the double-talk.

8. The method of claim 1, further comprising locking the echo return loss value when the echo return loss measurement remains static over a predetermined number of echo return loss measurements.

9. An apparatus for use in echo cancellation comprising:
   a non-linear processor that modifies a non-linear threshold value $T_{NLP}$ based on an echo return loss value; and
   a filter that clips an echo compensated signal at amplitudes between $+T_{NLP}$ and $-T_{NLP}$, wherein the echo return loss value is locked when an echo return loss measurement remains static over a number of echo return loss measurements.

10. The apparatus of claim 9, wherein the echo return loss value is based on a mapping of the echo return loss measurement to a member in a pre-defined set of echo return loss values.

11. The apparatus of claim 9, further comprising a measurer that measures an echo return loss to obtain the echo return loss measurement.

12. The apparatus of claim 9 wherein-the non-linear processor withholds modification of the $T_{NLP}$ during double-talk.

13. The apparatus of claim 9, further comprising a digital signal processor that detects double-talk.

14. The apparatus of claim 9, wherein the echo return loss measurement remains generally static over the period of time when the echo return loss measurement maps to a same member in a pre-defined set of echo return loss values over the period of time.

15. The apparatus of claim 9, wherein the echo return loss value is locked when the echo return loss measurement remains static over a predetermined number of echo return loss measurements.

16. A machine-readable medium having stored thereon sequences of instructions which when executed by a processor causes the processor to perform:
   modifying a non-linear threshold value $T_{NLP}$ based on an echo return loss value;
   center clipping an echo compensated signal at amplitudes between $+T_{NLP}$ and $-T_{NLP}$; and
   locking the echo return loss value when an echo return loss measurement remains static over a number of echo return loss measurements.

17. The machine-readable medium of claim 16, further comprising receiving the echo compensated signal.

18. The machine-readable medium of claim 16, further comprising determining the echo return loss value.

19. The machine-readable medium of claim 18, wherein determining the echo return loss value comprises mapping the echo return loss measurement to a member in a pre-defined set of echo return loss values.

20. The machine-readable medium of claim 16, further comprising measuring an echo return loss to obtain the echo return loss measurement.

21. The machine-readable medium of claim 16, further comprising withholding modification of the TNLP during double-talk.

22. The machine-readable medium of claim 21, further comprising detecting the double-talk.

23. The method of claim 16, further comprising locking the echo return loss value when the echo return loss measurement remains static over a predetermined number of echo return loss measurements.

* * * * *